United States Patent
Poulter

(12) 
(10) Patent No.: US 9,689,587 B1
(45) Date of Patent: Jun. 27, 2017

(54) THERMOSIPHON SOLAR COLLECTOR AND PROCESS

(71) Applicant: Allan Poulter, Hilton Head, SC (US)

(72) Inventor: Allan Poulter, Hilton Head, SC (US)

(73) Assignee: SHEPPARD & ASSOCIATES, LLC, Clemson, SC (US)

( * ) Notice: Subject to any disclaimer, the term of this patent is extended or adjusted under 35 U.S.C. 154(b) by 271 days.

(21) Appl. No.: 14/250,595

(22) Filed: Apr. 11, 2014

Related U.S. Application Data

(60) Provisional application No. 61/810,892, filed on Apr. 11, 2013.

(51) Int. Cl.
| | | |
|---|---|---|
| *F24J 2/40* | (2006.01) | |
| *F24J 2/46* | (2006.01) | |
| *F24J 2/44* | (2006.01) | |

(52) U.S. Cl.
CPC .............. *F24J 2/4607* (2013.01); *F24J 2/44* (2013.01)

(58) Field of Classification Search
CPC ...................................................... F24J 2/541
USPC ................................................. 126/576, 572
See application file for complete search history.

(56) References Cited

U.S. PATENT DOCUMENTS

| | | | | |
|---|---|---|---|---|
| 4,052,975 A | * | 10/1977 | Ceideburg | F24J 2/045 |
| | | | | 126/572 |
| 4,173,214 A | * | 11/1979 | Fattor | F24J 2/10 |
| | | | | 126/572 |
| 4,243,018 A | * | 1/1981 | Hubbard | F24J 2/067 |
| | | | | 126/576 |
| 4,399,807 A | | 8/1983 | Buckley et al. | |
| 4,483,154 A | * | 11/1984 | Smeal | F03G 7/00 |
| | | | | 62/235.1 |
| 4,706,650 A | | 11/1987 | Matzkanin | |
| 6,014,968 A | | 1/2000 | Teoh | |
| H2231 H | | 8/2009 | Teoh | |
| 2007/0244576 A1 | * | 10/2007 | Potucek | E04H 4/129 |
| | | | | 700/55 |
| 2009/0064680 A1 | * | 3/2009 | Ustun | F02C 6/14 |
| | | | | 60/641.8 |
| 2009/0113892 A1 | * | 5/2009 | Chen | F03G 6/065 |
| | | | | 60/641.8 |
| 2012/0131941 A1 | * | 5/2012 | Ackner | F24D 5/12 |
| | | | | 62/235.1 |

* cited by examiner

*Primary Examiner* — Avinash Savani
(74) *Attorney, Agent, or Firm* — J. Bennett Mullinax, LLC

(57) ABSTRACT

An automatic over-temperature control system for a solar collection is provided in which a light sensor in combination with an electronic solenoid valve is used to prevent entry of cold water into a thermosiphon solar collector during daylight intervals. By delaying entry of water until dusk (low light), the solar tubes have cooled sufficiently so water can be safely introduced into an empty or depleted solar collector without damaging the collector tubes.

4 Claims, 1 Drawing Sheet

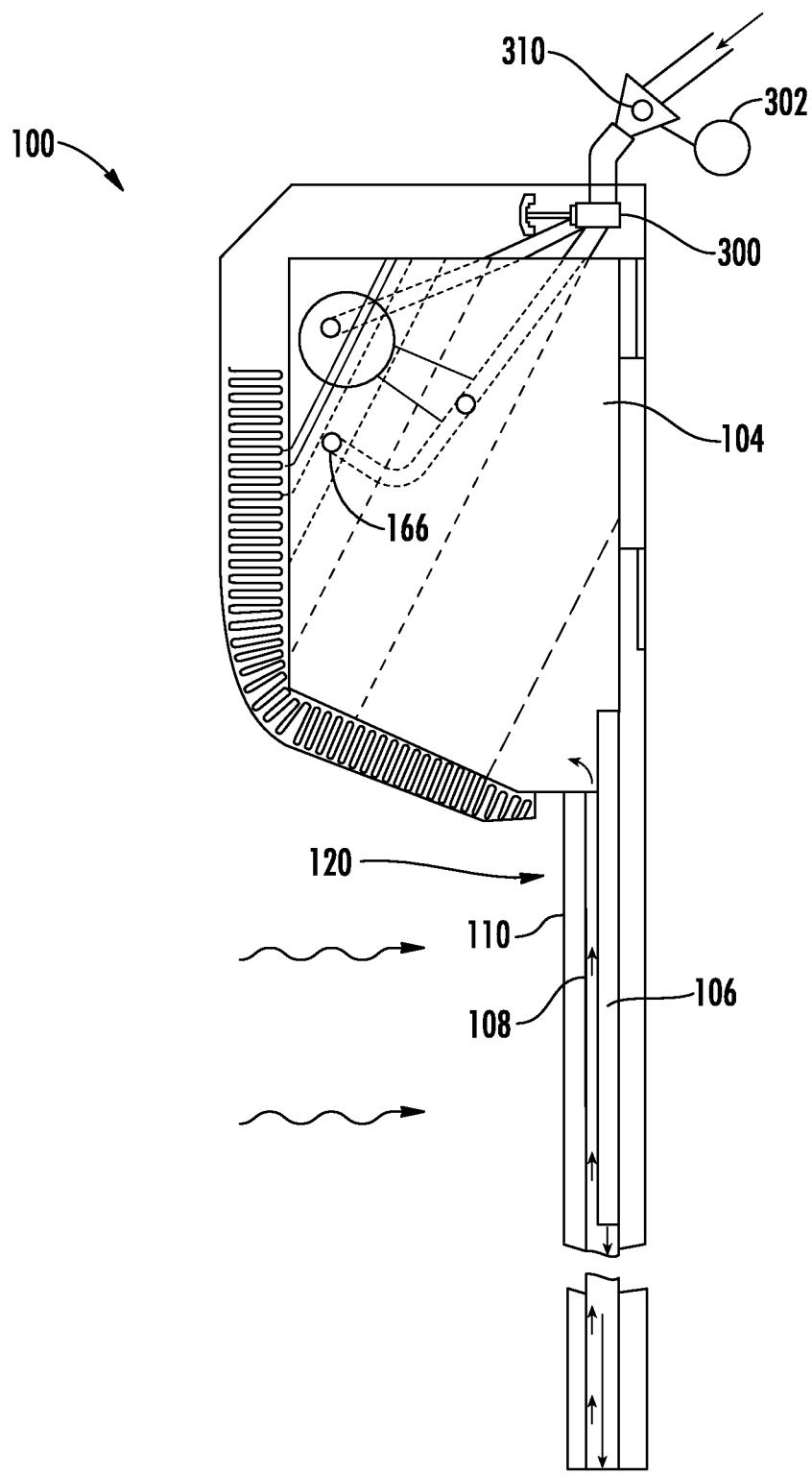

THERMOSIPHON SOLAR COLLECTOR AND PROCESS

RELATED APPLICATIONS

This application claims the benefit of U.S. Application Ser. No. 61/810,892 filed on Apr. 11, 2013 and which is incorporated herein by reference.

FIELD OF THE INVENTION

This invention relates to solar water heaters. More particularly, it relates to a method of, and apparatus for, preventing overheating and thermal destructions of glass tube solar collector panel in a closed circulation system including an interconnected hot water storage tank suitable for heating domestic hot water.

It is a particular object of the invention to provide an automatic system for protecting a solar collector from over-temperature operation by limiting the refill of colder water to the solar collector panel to intervals where the solar collector tubes are sufficiently cool that the introduction of the glass vacuum tubes does not result in a thermal shock destruction of the glass vacuum tubes.

BACKGROUND OF THE INVENTION

This invention relates generally to passive or low pressure, solar water heating systems. A solar collector panel absorbs solar energy into a heat exchange liquid, normally water. For maximum solar heating, the collector panel is tilted from above 20 to 60 degrees from horizontal depending upon geographical latitude. In a passive system, by thermosiphon operation, cooler water is admitted to the bottom of the solar collector after traversing a storage tank which may or may not include a heat exchanger. Water leaves the top of the solar collector and passes through a one-way valve. This valve permits water heated in the solar panel to pass to the storage tank, but reverse circulation is prevented. Such action prevents reverse thermosiphoning of hot water from cooling the water in the storage tank in cloudy weather or at night. In other thermosiphon devices, reverse circulation may be prevented by having the storage tank above the solar collector. The heated water may pass through either the tank containing a heat exchanger or a heat exchanger in the tank.

In a "passive" system, no external power is required to pump liquid between the collector and the storage tank, but for continuous liquid circulation the water level must be maintained above the highest inlet pipe from the collector into the storage tank. Thermosiphoning is the sole motive power for liquid circulation in the closed loop. If liquid is lost from the system there may be a break in this continuous circulation path. A break or separation in the loop of more than about one half inch of vertical height will prevent circulation under the weak force of thermosiphoning. In such a case, the system fails and the only indication may be a lack of heat output from the solar system.

If circulation is broken, the relatively small amount of heated water in the solar collector panel will not recirculate to the storage tank. Thus, cooler water cannot enter the bottom of the collector panel from the storage tank. Consequently the "trapped" liquid in the panel will boil. In the usual arrangement, the circulation system is vented to the atmosphere. Thus, the liquid in the panel evaporates, thereby further depleting water from the system. If additional cold water is added to the system to bring up the volume to operating levels, the thermal shock which results from the cold water entering the glass vacuum tubes will result in a shattering of the vacuum tube.

In low pressure solar water heating systems, similar problems can arise. Such systems are similar to passive systems but may use a low pressure, or low volume, mechanical pump to assist or replace thermosiphon circulation. Mechanical pumps are of course subject to failure because of loss of electric power to the pump motor, pump bearing seizure, impeller stall and other electrical or mechanical problems. When forced circulation ceases, the liquid in the collector can overheat or evaporate so that damage to the collector panel results. Again, replacement of low water volumes at inappropriate times may result in a destructive thermal shock to the system.

Accordingly there remains room for improvement and variation within the art.

SUMMARY OF THE INVENTION

It is one aspect of at least one of the present embodiments to provide an automatic over-temperature control system in which a light sensor in combination with an electronic solenoid valve is used to prevent entry of cold water into a thermosiphon solar collector during daylight intervals. By delaying entry of water until dusk (low light), the solar tubes have cooled sufficiently so water can be safely introduced into an empty or depleted solar collector without damaging the collector tubes.

Further objects and advantages of the present invention will become apparent from the following detailed description of the best modes for carrying out the invention taken in conjunction with the drawings which form an integral part of the specification.

BRIEF DESCRIPTION OF THE DRAWINGS

A fully enabling disclosure of the present invention, including the best mode thereof to one of ordinary skill in the art, is set forth more particularly in the remainder of the specification, including reference to the accompanying drawings.

FIG. 1 is a diagram of a thermosiphon system and a cold water inlet responsive to a light sensor seen as part of a solar water heater.

DESCRIPTION OF THE PREFERRED EMBODIMENT

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to, yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

In describing the various figures herein, the same reference numbers are used throughout to describe the same material, apparatus, or process pathway. To avoid redundancy, detailed descriptions of much of the apparatus once described in relation to a FIGURE is not repeated in the descriptions of subsequent figures, although such apparatus or process is labeled with the same reference numbers.

As best seen in reference to FIG. 1, a thermosiphon system 100 includes a collector 120 and a storage tank 104 mounted above the collector 120. Collector 120 includes an inlet 160 for receiving water from a outside supply source.

The collector 120 preferably further comprises a plurality of glass vacuum coaxial three tube assemblies comprising a first tube 106 which receives incoming (cooler) water from tank 104. Along a bottom of tube 106 an opening is provided which allows communication with the adjacent tube 108 which allows convectional flow of water back to collector 120 and as seen by the directional arrows. Tubes 106 and 108 are further sealed for most of their length within a glass vacuum tube 110. The construction and use of coaxial, three tube structures for solar heating of a fluid such as water is well known in the art. As sunlight is directed to the collector 120, the water inside the collector 120 is heated. Due to natural convection, the heated water and collector moves upwardly to the top of the storage tank 104 as cooler water is introduced into the opening of first tube 106.

As illustrated, storage tank 104 includes an inlet 300 in the lower portion of the tank 140. The inlet 300 may receive water directly from a city water source or well and the outlet, seen in the form of a floating valve 166, withdraws water from an upper portion of the interior of tank 104 and may be used to deliver heated water to an auxiliary tank such as a hot water heater or other point of use application.

As been seen in references to FIGURE, a light sensor 302 is associated with the solar collector. Light sensor 302 is activated by a low light condition. The light sensor switch controls a solenoid valve 310. The valve 310 is normally closed except under conditions that when ambient light has reached a point that the glass tubes has cooled down enough to withstand a thermal shock. As a result, if the liquid circulating within the solar collector is lost or reaches a dangerously low volume such that the glass tubes within the collector may shatter when cooler water enters, the interaction between the light sensor 302 and valve 310 prevents cooler water from entering the collector. The only time cool water will enter the collector is in low light levels such as dusk or night time by which time temperature of the glass tubes within the collector has cooled. Once cooled, the entry of water into the tube portion of the collector will not shatter the glass tubes.

The interaction of the light sensor 302 and the solenoid valve 310 will prevent the entry of cool water from the inlet 300 if ambient light conditions are too high or if there is, a power failure that prevents operation of the sensor or solenoid valve. This combination of events operate as a fail safe to prevent the introduction of cold water that could damage the glass collector tubes 106/108 in the event a power failure.

The location of light sensor 302 and solenoid valve 310 can be varied. So long as the light sensor is in an area that will receive ambient light and connect with the solenoid control of valve 310, placement of the light sensor may be made at various locations.

It is within the scope of the present invention to regulate the input of either unheated supply water to the collector or the introduction from a heated tank, or cooler tank water. Even though the heated tank water may be at a temperature of about 190° F., the introduction of heated water to overheated glass vacuum tubes can still cause a thermal shock.

An additional preferred embodiment of the invention can be seen in reference to U.S. Pat. No. 6,014,968 which is incorporated herein by reference along with US Statutory invention Registration US H2231 H which was published Aug. 4, 2009 in which is also incorporated herein by reference. As set forth in the above referenced patents and publications, a preferred use of glass tubes to form part of the solar collector is described. The use of the glass tubes is preferred in terms of achieving maximum recovery of heat from the sun. By way of the Applicant's invention, by using a light sensor which is actuated in low light conditions, the entry of water either from a direct supply line or from a storage tank can be regulated to insure that the glass tubes are at a temperature below a thermal shock value of the incoming water.

Additional embodiments to may be modified in accordance to the present invention include embodiments described in U.S. Pat. No. 7,398,779 and which is incorporated herein by reference.

To the extent thermosiphon operated solar collectors have component parts that are subject to thermal shock upon exposure to the extreme changes in temperature, the present invention is suitable for use with such collectors. By incorporating a light sensor to one or more control valves that will supply additional water to the solar collector, the introduction of water from the valve controlled source can be controlled. It should be noted that the normal operation of the thermosiphon in terms of a closed circulation of hot water rising to a storage tank and cooler water recirculating to the collector is not interrupted by the present invention. It is only the introduction of water to correct a low volume or loss of water conditioned from the collector that is regulated.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention as set forth herein. In addition, it should be understood that aspects of the various embodiments may be interchanged, both in whole, or in part. Therefore, the spirit and scope of the invention should not be limited to the description of the preferred versions contained therein.

The invention claimed is:

1. A thermosiphon solar collection system comprising:
   a collector, the collector comprising, a plurality of glass tubes;
   a storage tank in communication with the collector;
   a supply valve in communication with the collector, the supply valve in communication with a least one of an intake source of fluid or a fluid source from the storage tank;
   a light sensor, the light sensor responsive to low light conditions and in further communication with the supply valve wherein the light sensor prevents the introduction of the fluid or the fluid source through the valve during ambient daylight conditions.

2. A process for operating a thermosiphon solar collector comprising steps of:
   providing a thermosiphon solar collector having a plurality of glass tubes within a heat absorbing portion of the collector;

providing a light sensor which is responsive to periods of low light;

preventing the introduction of replacement fluid to the vicinity of the glass tubes under conditions of ambient daylight as controlled by the light sensor; and introducing water into the collector portion of the solar heater only under conditions low light wherein the low light conditions are indicative of a time interval wherein the glass tubes have not been exposed to direct sunlight for an interval sufficient for the solar collector tubes to cool to a safe resupply temperature.

3. The collection system according to claim 1 wherein the intake source of fluid or a fluid source from a storage tank is water.

4. A thermosiphon solar collection system comprising:

a collector, the collector comprising a plurality of glass tubes;

a storage tank in communication with the collector;

a supply valve in communication with the collector, the supply valve in communication with a least one of an intake source of fluid or a fluid source from the storage tank, the at least one of an intake source of fluid or a fluid source from the storage tank being in direct contact with the plurality of glass tubes;

a light sensor, the light sensor responsive to low light conditions and in further communication with the supply valve wherein the light sensor prevents the introduction of the fluid or the fluid source through the valve during ambient daylight conditions wherein the plurality of glass tubes during ambient light conditions are heated to high temperature; and, wherein the light sensor prevents the supply valve from introducing the fluid into the plurality of glass tubes during ambient daylight conditions, thereby preventing a shattering of the high temperature glass tubes by the introduction of a fluid during.

* * * * *